INVENTOR.
JOHN R. BRADEN

United States Patent Office 3,198,558
Patented Aug. 3, 1965

3,198,558
PRESSURE BALANCED PIVOTAL JOINT
FOR PIPING SYSTEMS
John R. Braden, Anne Arundel County, Md.
Filed Apr. 29, 1963, Ser. No. 276,667
9 Claims. (Cl. 285—228)
(Granted under Title 35, U.S. Code (1952), sec. 266)

The invention described herein may be manufactured and used by or for the Government of the United States of America for governmental purposes without the payment of any royalties thereon or therefor.

This invention relates to flexible coupling members for absorbing movements and vibration in piping systems; and more particularly it relates to pressure balanced coupling member for connecting conduits in a piping system and for quietly absorbing translational, torsional or vibratory movements of the system.

In the part, piping systems, and particularly those which convey high temperature fluids such as superheated steam, have employed expansion joints to compensate for movements due to thermal expansion or contraction. These joints have been rather large in physical size, were relatively inflexible, and have had a relatively short service life when subjected to continuous or nearly continuous movement. Furthermore, these expansion joints have had no provision for absorbing other movements such as vibratory or limited angular movements which often occur in piping systems. Additionally, these joints were often noisy in operation and failed to provide means for controlling leakage at the individual coupling members.

With these shortcomings in mind, it is an object of the present invention to provide a coupling member which is capable of absorbing translational, torsional and/or vibrational movements of the piping system in which said coupling member is installed.

Another object of this invention is to provide a coupling member so constructed that it is pressure balanced internally by means of the fluid flowing through the piping system in which the coupling member is used and externally by means of structural members changeable in volume responsive to external pressures, such fluid pressure balancing thereby permitting said coupling member to make its required movements without first overcoming the system fluid pressure.

A further object of this invention is to provide an improved coupling member which is substantially leak-proof which is not cumbersome in physical size, which performs its required movements in response to the application of very small forces, and which has an extended service life even when subjected to continuous or nearly continuous movement.

Still another object of this invention is to provide a pressure balanced coupling member having means for transferring fluid internally therethrough with a minimum of disturbance to the flow characteristics of the fluid.

Yet a further object of this invention is to provide a coupling member having a means therein which permits the moving parts of said member to move in their desired directions while preventing such moving parts from moving in all other directions.

Other objects, advantages and salient features of the present invention will become apparent from the following description, taken in connection with the accompanying drawings, which illustrate a preferred embodiment, in which.

Figure 3:
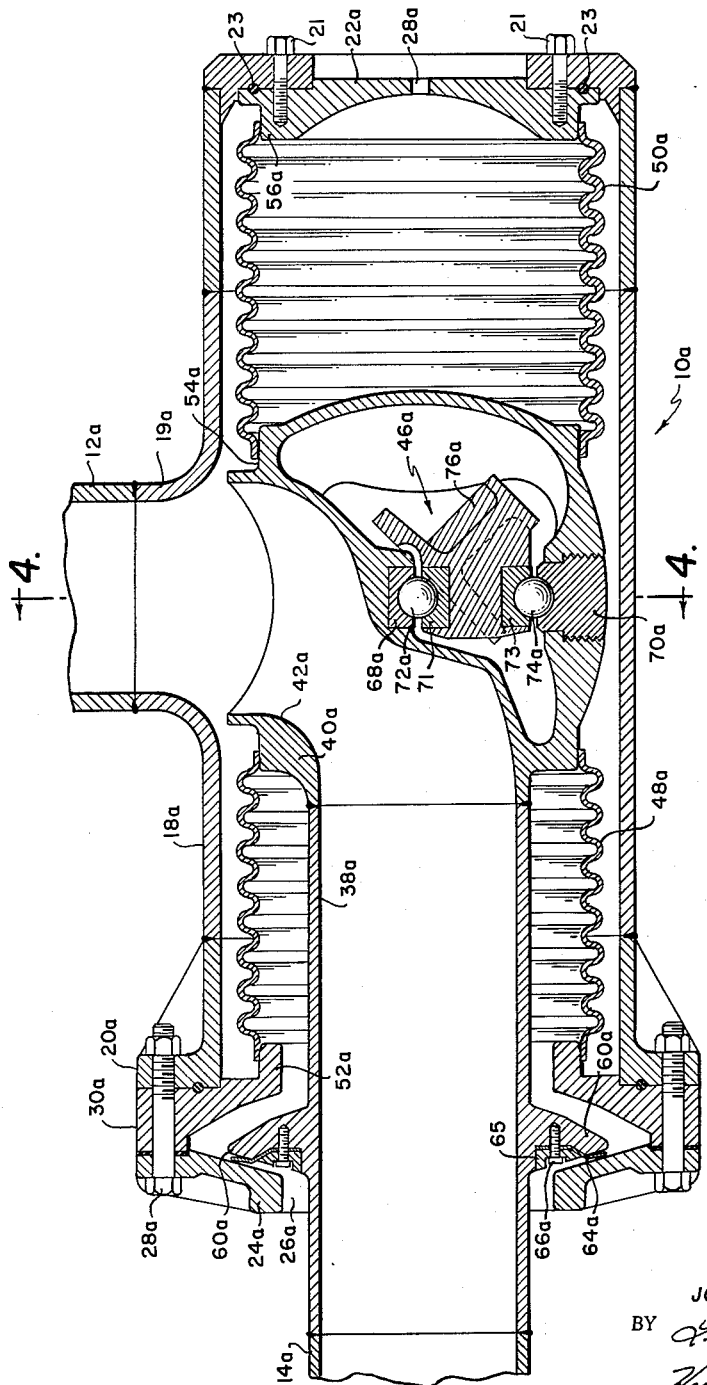

FIG. 3. is a sectional view of a modified form of coupling member;

FIG. 4 is a transverse sectional view taken along line 4—4 of FIG. 3.

Figure 1:
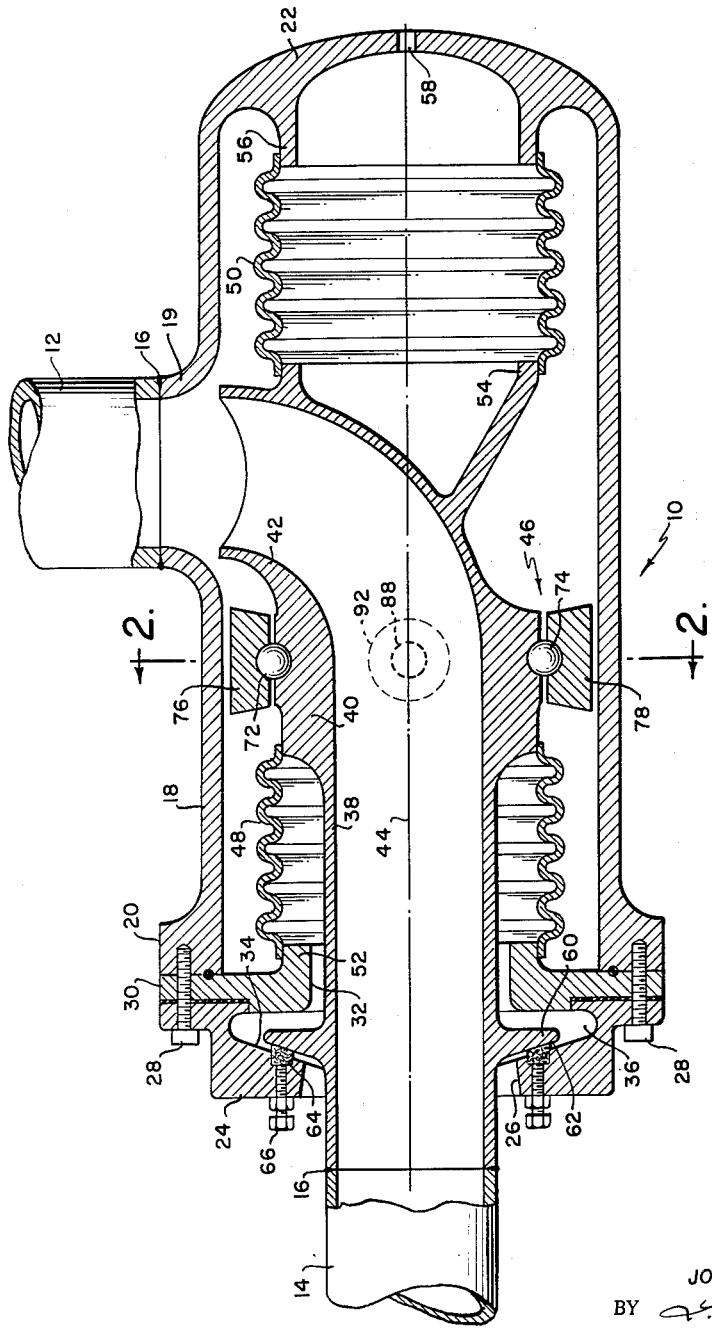
FIG. 1 is a sectional view of a coupling member in accordance with the present invention, said coupling member being mounted within a piping system, shown in part.

Referring now to the drawings and particularly to FIG. 1, a coupling member, generally designated 10, is shown mounted between two pipes 12 and 14 of a piping system. Though the coupling 10 is shown retained in position by means of welding 16, it should be understood that threading or any other suitable form of attachment means can be used to mount the coupling member within the piping system.

The coupling member has an outer casing means 18, in the form of a tubular member, having an open end 20 and a substantially imperforate end 22, axially aligned along the axis of the pipe 14 of the piping system. The casing means 18 has an upstanding boss portion 19 for attaching the coupling member 10 to the pipe 12 of the piping system. An end cap 24 with a central aperture 26 is provided adjacent the open end 20 and is connected thereto by suitable fastening means, such as a plurality of bolts 28.

An annular ring member 30 is interposed between the end cap 24 and the open end 20 of the coupling member 10. The ring member 30 has a central aperture 32 of substantially the same diameter as the end cap aperture 26. The inner face 34 of the end cap 24 is contoured to provide a cavity 36 between the end cap 24 and the ring member 30.

The coupling member 10 also has an inner conduit means 38 in the form of a tubular pipe having one end extending through the end cap aperture 26 for attachment to the pipe 14 of the piping system. The conduit means has a thickened central portion 40 and an arcuate bend portion 42 which curves away from the central axis 44 of the coupling member 10 and terminates near the boss 19. The conduit means 38 is mounted within a gimbal means, generally designated 46.

The coupling member 10 is pressure balanced to permit rotational movement of the conduit means 38 with respect to the gimbal means 46 independently of the forces caused by fluid flow through said coupling member. The pressure on one side of the gimbal means 46 is equal to, and thus balances, the pressure on its other side. This pressure balancing feature is achieved through utilization of a pair of flexible, corrugated, and preferably heat resistant bellows members 48 and 50 preferably of equal diameter. The member 48 is fixedly connected, by suitable attachment means, between the central portion 40 of the tubular conduit means 38 and a flange or rim portion 52 of the ring member 30. The member 50 is fixedly connected, by suitable attachment means, between a rim portion 54 extending from the arcuate portion 42 of the tubular means 38 and a rim portion 56 extending from the end 22 of the coupling member. The bellows members 48 and 50 obviously provide seals at each end of casing 18 preventing escape of high pressure system fluid without appreciably restricting rotational movement of the pipe 14 relative to the casing 18.

As fluid flows through the piping system, it flows through the coupling member 10 via the tubular conduit means 38. As such fluid leaves the terminal end of the tubular conduit, it fills the inside of the coupling member 10 by filling the cavity existing between the inside of the casing 18 and the outside of the members 48 and 50. After such fluid, at system flow pressure, fills the inside of the coupling member 10, it exits through the outlet at boss 19 and continues to flow through the piping system via the pipe 12.

Air at atmospheric pressure is introduced into the inside of the members 48 and 50. Such air enters member 48 by flowing through the end cap aperture 26, and enters member 50 by flowing through a small atmospheric vent 58 in the end 22.

By proper proportioning of the effective contact areas of the bellows 48 and 50 pulling against each other on each side of the tubular conduit means 38, the effective air pressure on each side of the gimbal means 46 is made equal, thus producing no axial thrust force on the gimbal means itself. The entire gimbal means is surrounded by fluid at system static pressure, so additional fluid flow through the coupling member 10 will not cause any unbalance or thrust forces on the gimbal means 46. Thus, it is apparent that the entire interior of the coupling member 10 is pressure balanced, thereby permitting the conduit member 38 to be moved about the gimbal means 46 without having to overcome any forces other than those of friction of the gimbal itself.

The members 48 and 50 also serve to provide sealing means to prevent the fluid surrounding their exterior surfaces from leaking out of the coupling member through the aperture 26 or the vent 58.

The tubular conduit means 38 is provided with a flange portion 60 extending into the cavity 36 and having a contoured surface 62 similar to the contour 34 of the end cap 24. As the conduit means 38 vibrates, oscillates or nutates about its central axis 44 due to normal movements during operation, the flange 60 moves freely within the cavity 36. A packing ring 64 on the contoured surface 34 of the end cap 24 slidably engages the surface 62 of the flange 60.

Normally the packing ring 64 does not tightly contact the flange surface 62, since a tight contact would not only inhibit free movement of the flange 60, but would also prevent the desired flow of air into the member 48. However, if the seals of the member 48 should fail, and fluid should begin to leak into the interior of the member, the packing ring 64 may be moved into tight contact with the flange 60 to prevent such fluid from leaking out through the aperture 26. To accomplish this, an adjustable screw means 66 is provided for varying the position of the packing ring 64.

Figure 2:
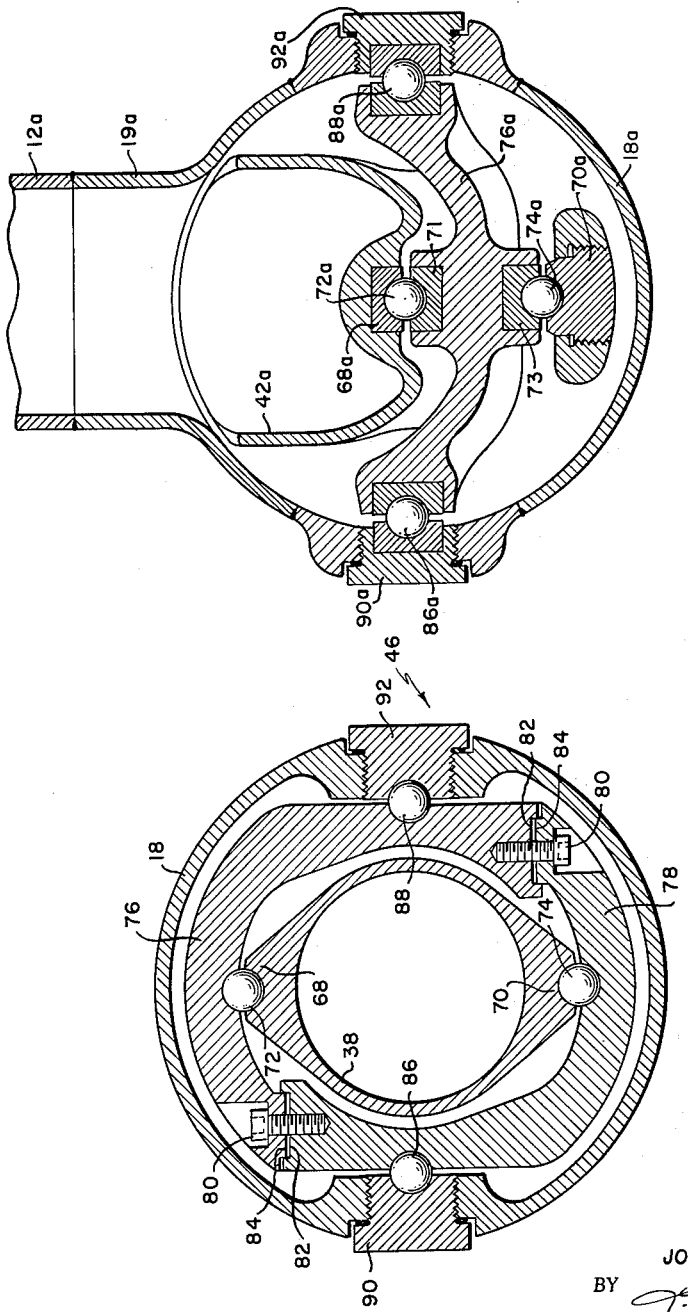
FIG. 2 is a transverse sectional view taken along line 2—2 of FIG. 1.

The gimbal means 46 is shown in greater detail in FIG. 2. The conduit 38 has provided thereon at opposite ends of a diameter thereof a pair of pivot support means 68, 70 having hemisperically shaped apertures therein for supporting a pair of ball bearing pivots 72, 74. The ball bearing pivots 72, 74 also fit within pivot support recesses provided on the interior surface of a gimbal ring which may be made in two sections 76, 78 fixedly interconnected by means such as bolts 80. The interconnection between the two sections 76, 78 is preferably made in such a manner that the pivot bearings 72, 74 are preloaded. This may be accomplished as shown in the figure by providing mating portions 82, 84 at each of the joints between the two sections of the gimbal ring so that the amount of preloading on the pivot bearings is made adjustable by means of the bolts 80.

The gimbal ring is in turn pivotally mounted on the casing 18 by means of a pair of diametrically opposed pivot bearings 86, 88. The pivot bearings 86, 88 are also preferably preloaded which may be accomplished by means of a pair of pivot holding screws 90, 92 threadedly mounted through the casing 18.

The preloading of the gimbal arrangement eliminates back lash between the parts and promotes quiet operation, particularly when subject to vibrations. The preloading, however, is not sufficiently heavy to prevent pivoting. The joint must be free to absorb movements of the piping system within the degree of limitations imposed on the structure.

A modified embodiment of the novel coupling of this invention is shown in FIGS. 3 and 4. In this embodiment, there is shown a coupling member, generally designated as 10a interconnecting two pipes 12a and 14a of a piping system. This coupling comprised a tubular casing means 18a having an open end 20a and a closure plate 22a secured across the opposite end by any suitable means such as bolts 21 as shown. There is also provided boss 19a for attaching the coupling to the pipe 12a. The connection between the closure plate 22a and the pipe end is made watertight by means such as a sealing ring 23. At the open end 20a there is again secured, by means such as bolts 28a, an end cap 24a having a central aperture 26a. An annular ring member 30a is interposed between the end cap 24a and the open end 20a of the coupling member 10a.

The coupling member 10a also has an inner conduit means 38a in the form of a tubular pipe having one end extending through the aperture 26 of the end cap for attachment to the pipe 14a of the piping system. There is provided a flange 60a on the conduit means 38a which flange is positioned in the space formed between the ring member 30a and the end cap 24a. Since there will be relative movement between the flange 60a, which moves with the conduit 38a, and the aforesaid space, the flange is provided with a lip type sealing device 64a which may be held in place on the flange by any suitable means such as bolts 66a and a retaining ring 65.

The conduit means has a thickened portion 40a and an arcuate bend portion 42a terminating near the boss 19a of the casing 18a and is supported by gimbal means designated generally as 46a.

The coupling member 10a is again pressure balanced to permit movement of the conduit means 38a with respect to the gimbal means 46a independently of forces caused by fluid flow. To this end there are again provided a pair of flexible corrugated members 48a and 50a. The member 48a is fixedly attached between the thickened portion 40a of the tubular conduit means 38a and a flange portion 52a of the ring member 30a. The member 50a is fixedly connected between a rim portion 54a extending from the arcuate portion 42a of the tubular conduit 38a and a rim portion 56a provided on the end plate 22a of the coupling member.

Fluid flowing through the system via the conduit 38a fills the space between the casing 18a and the outside of the members 48a and 50a as was described with reference to the embodiment shown in FIGS. 1 and 2.

Air at atmospheric pressure is introduced into the inside of the members 48a and 50a. For atmospheric ventilation there is provided a vent 28a in the end plate 22a. Air enters the member 48a through the space provided by the lip type sealing device 64a on the flange 60a. The sealing device 64a is designed to allow air to pass from outside the chamber onto the member 48a but in the event of leakage inside due to a rupture of the bellows, the lip will be sealed by internal pressure against the end cap 24a.

The gimbal means 46a may be seen more clearly with FIG. 4 taken in conjunction with FIG. 3. At the arcuate bend portion of the conduit 38a there is provided a first pivot support bearing 68a mounted opposite an adjustable bearing 70a mounted in an aperture 71 in the rim portion 54a of the conduit. A pair of ball pivots 72a, 74a are mounted in the pivot bearing 68a and 70a, respectively. The ball pivots 72a and 74a also fit within pivot support bearings 71, 73 which are mounted in recesses provided on a gimbal member 76a.

The gimbal member 76a is pivotably mounted on the casing 18a by means of a pair of adjustable diametrically opposed ball pivots 86a, 88a. The ball pivots are adjustably loaded by means of a pair of pivot holding screws 90a, 92a threadedly mounted through the casing 18a. As in the embodiment described in FIGS. 1 and 2 the gimbal means of the embodiment of FIGS. 3 and 4 are preferably preloaded by means of the adjusting screws 90a, 92a and 70a.

Thus there has been described a pressure balanced pivotal joint for piping systems. The bellows arrangements provide a leak-proof seal and since the system pressure is on the outside of the bellows there is a reduced possibility of explosive type of failure of the bellows even without restraining wire braid which would be necessary in the bellows if the pressure of the system were to be placed only within the bellows. Since the system is pressure balanced the system pressure has no tendency to displace any of the moving parts of the system, yet the device is easily flexed because all movements are independent of the system pressure.

The preloaded gimbal assembly in the combination described protects the bellows from torsional loading, limits movement of the bellows thus giving long life, and prevents surging of the bellows. It also positions the moving parts of the flexible section and forms a positive pivot for the angular oscillation of the inner pipe within the outer casing.

The device may be adapted to various types of piping systems by modifying the size, strength and material of the pressure carrying members to suit the pressure temperature, and other characteristics of the fluid in the system.

Obviously many other modifications and variations of this invention are possible in the light of the above teachings. It is therefore to be understood that within the scope of the appended claims the invention may be practiced otherwise than as specifically described.

What is claimed is:
1. A pivotal joint for a piping system comprising:
   a tubular casing having an opening for connection to a first pipe of the piping system;
   said tubular casing having a first aperture;
   a tubular member extending through said first aperture in spaced relation to the walls of the casing, whereby said member has at least limited lateral movement in the aperture;
   said tubular member having inlet means exterior of said tubular casing for connection to a second pipe of said piping system and outlet means, said tubular member comprising an elbow portion open to the interior of said tubular casing;
   gimbal means mounted on the interior wall of said tubular casing and on the tubular member for pivotally supporting said tubular member in spaced relation from the interior surface of said tubular casing, said gimbal means being positioned substantially at a midsection of said tubular casing;
   a first bellows member mounted concentrically over said tubular member and disposed within said tubular casing, said first bellows member having a first end sealably secured to the external surface of said tubular member and a second end sealably secured to the wall of the tubular casing and circumscribing said first aperture whereby a seal is formed between the tubular member and the tubular casing enabling pivotal movement of said tubular member in said tubular casing, the interior of said first bellows being open to atmospheric pressure thru said first aperture;
   a second bellows member of essentially equal diameter to said first bellows member and disposed interiorly of said tubular casing coaxially with said first bellows member, said second bellows member having a first end secured to the interior wall of said tubular casing opposite said first aperture and a second end secured to the exterior surface of said elbow portion whereby a chamber is defined by said second bellows, said interior wall of said tubular casing and said exterior surface of said elbow portion;
   a second aperture in the wall of said tubular casing communicating with said chamber enabling a free flow of air between said chamber and the atmosphere whereby a force acting on said tubular member adjacent said first bellows and tending to displace said tubular member in one direction is counterbalanced by a second equal force acting on said elbow portion through said chamber in a direction essentially opposite from said first force.

2. A pivotal joint as defined in claim 1 wherein a ring member is provided at one end of said tubular casing for supporting an end of said first bellows member.

3. A pivotal joint as defined in claim 1 wherein said gimbal means is positioned substantially at the elbow portion of said tubular member.

4. A pivotal joint as defined in claim 3 wherein limiting means are provided to limit the amount of movement of said tubular member around said gimbal means.

5. A pivotal joint as defined in claim 4 wherein said limiting means include:
   an end cap on said tubular casing mounted exteriorly of said ring member and forming a circumferential space therewith, said end cap having an aperture therein through which the inlet end of said tubular member is passed; and
   a flange on said tubular member and extending into said space.

6. A pivotal joint as defined in claim 5 wherein said gimbal means comprises a first pair of pivots on diametrically opposed portions of the interior surface of said tubular casing forming a first pivotal axis and a second pair of pivots forming a second pivotal axis at right angles to said first pivotal axis.

7. A pivotal joint as defined in claim 6 wherein said second pair of pivots are fixedly spaced with respect to said tubular member.

8. A pivotal joint as defined in claim 7 wherein said second pair of pivots are positioned at diametrically opposed points on said tubular member.

9. A pivotal joint as defined in claim 8 wherein said pivots are ball shaped and said means for preloading said gimbal means include adjustable means for increasing the friction on said ball shaped pivots.

References Cited by the Examiner
UNITED STATES PATENTS

| | | | |
|---|---|---|---|
| 1,681,626 | 8/28 | Russell | 285—265 X |
| 2,787,124 | 4/57 | Donahue | 285—192 X |
| 3,053,554 | 9/62 | Magos | 285—226 X |

FOREIGN PATENTS

| | | |
|---|---|---|
| 71,045 | 7/42 | Czechoslovakia. |
| 534,704 | 10/31 | Germany. |

CARL W. TOMLIN, *Primary Examiner.*